Patented Aug. 14, 1923.

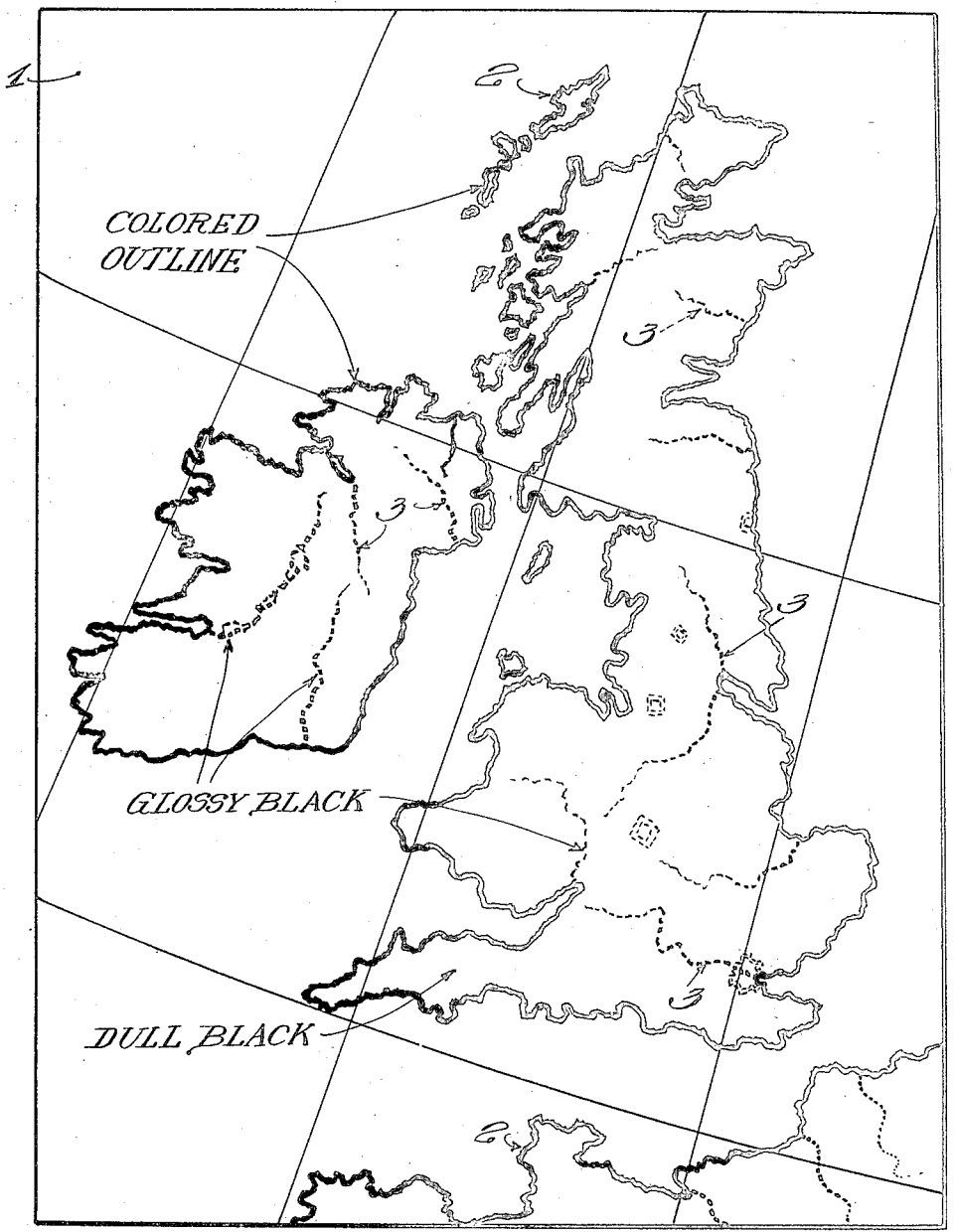

1,464,753

UNITED STATES PATENT OFFICE.

LEVINUS PHILIP DENOYER, OF CHICAGO, ILLINOIS, ASSIGNOR TO DENOYER-GEPPERT CO., OF CHICAGO, ILLINOIS.

LECTURER'S CHART.

Application filed March 2, 1922. Serial No. 540,547.

*To all whom it may concern:*

Be it known that I, LEVINUS P. DENOYER, a citizen of the United States, residing at Chicago, in the county of Cook and State of Illinois, have invented certain new and useful Improvements in Lecturers' Charts; and I do declare the following to be a full, clear, and exact description of the invention, such as will enable others skilled in the art to which it appertains to make and use the same.

My invention relates to charts or maps such as those used by school teachers and other lecturers and one object is to provide a chart in which the main lines of demarkation are distinctly visible to the class of students or others, while details such as rivers, mountain ranges, cities, railways and other natural or man-made features are designated by indicating lines of the same color as the background of the chart, said lines being visible to the lecturer only, so that he may readily determine the locations, courses, etc., of different points of interest while lecturing.

A further aim is to provide a background of such nature as to permit the use of crayons thereon for temporarily amplifying the disclosure, during the course of the lecture, by following the indicating lines above referred to.

With the foregoing in view, the invention resides in the novel subject matter hereinafter described and claimed, the description being supplemented by the accompanying drawing, which for sake of illustration, discloses a map of the British Isles.

The background 1 is formed of cloth or other material of any desired color, although slated cloth of well-known characteristics is preferably used. This slated cloth possesses a dull black surface sufficiently rough to permit the use of ordinary chalk or crayons thereon, and this surface possesses little or no lustre. Printed in permanent ink upon the background 1 are the main lines of demarkation 2 of such boldness and color as to be clearly visible at a distance from the map. When a black background is used, white or yellow is preferably employed in printing the lines 2, but this is not essential. These lines are usually arranged to give the general outlines of any geographical division or outline of any other area to be discussed, but none or few of the details, such as rivers, mountains, railways, etc., are visibly printed. These details however are indicated on the background 1 by printing either broken or unbroken lines 3, using the same colored ink as said background but possessing sufficient lustre to permit these lines to be seen by the lecturer when close to the map. From the distance, however, the indicating lines 3 cannot be seen.

It will be seen that the invention above described will be of great assistance to teachers and other lecturers in pointing out different features of interest during the course of a lecture, and temporarily showing them upon the chart by use of chalk or other crayons. After a lecture, however, the temporary lines may be readily erased, leaving the chart in readiness for another lecture.

While I have illustrated my invention by means of a geographical example, it will be understood that it is not limited to natural geographical formation. For instance, in teaching proper erections of certain structures, their main outlines may be distinctly printed to be visible to the class, while details such as the location of columns, struts, girders and the like, may be printed in lustrous ink of the same color as the background, to be visible only to the teacher.

In the manufacture of the maps constructed in accordance with this invention, slated black cloth having practically no lustre has been used for the background 1, yellow ink has been printed on this cloth to show the main outlines or other lines of demarkation 2, and black ink which will possess a lustre when dry, has been employed for printing the details 3. It is to be understood however that colors other than those which have actually been used, may well be employed and furthermore that the invention is not restricted to any particular details other than those specified in the following.

I claim:

1. A lecturer's chart having lines of demarkation clearly visible at a distance, and indicating lines of the same color as the background of the chart invisible at a distance but visible to the lecturer when close to the chart.

2. A lecturer's chart having a markable and readily cleanable background, said chart having permanent lines of demarkation provided upon the background and of a color contrasting with the background so as to be clearly visible at a distance, and permanent indicating lines substantially of the same color as the background so as to be invisible at a distance but visible to the lecturer when close to the chart, serving to guide him in amplifying the disclosure by means of temporary indicating lines.

3. A lecturer's chart having a solid background permitted of being marked and then readily cleaned, said chart having permanent lines of demarkation distinct in color from the background, and permanent faintly lustrous indicating lines of substantially the same color as said background, said indicating lines being invisible at a distance but visible to the lecturer when close to the chart, whereby to guide him in amplifying the disclosure by means of temporary indicating lines.

In testimony whereof I have hereunto set my hand.

LEVINUS PHILIP DENOYER.